March 17, 1959     C. E. TACK ET AL     2,877,870
CONSTANT CONTACT RAILWAY BRAKE ARRANGEMENT
Filed Nov. 14, 1955     4 Sheets-Sheet 1
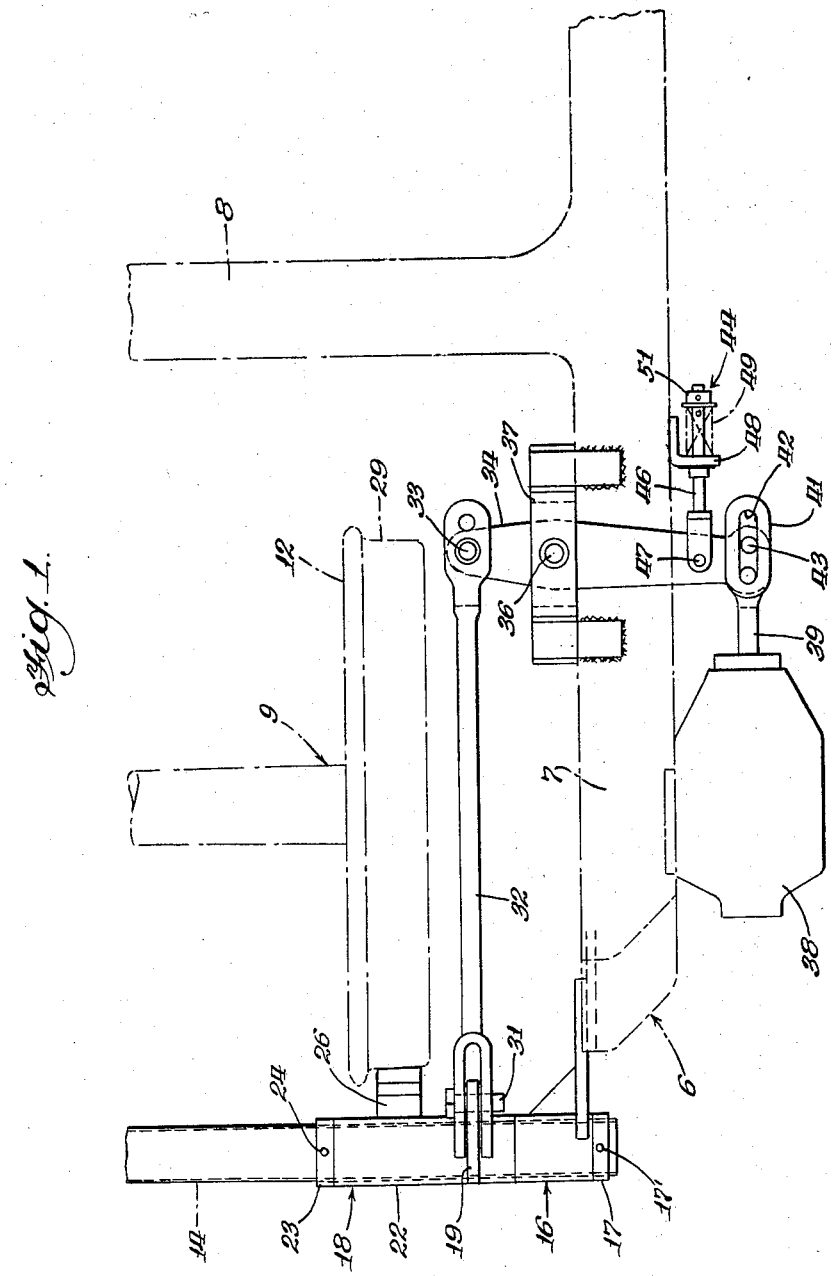
INVENTORS.
Carl E. Tack
Walter R. Polanin March 17, 1959　　　C. E. TACK ET AL　　　2,877,870
CONSTANT CONTACT RAILWAY BRAKE ARRANGEMENT
Filed Nov. 14, 1955　　　　　　　　　　　　4 Sheets-Sheet 2
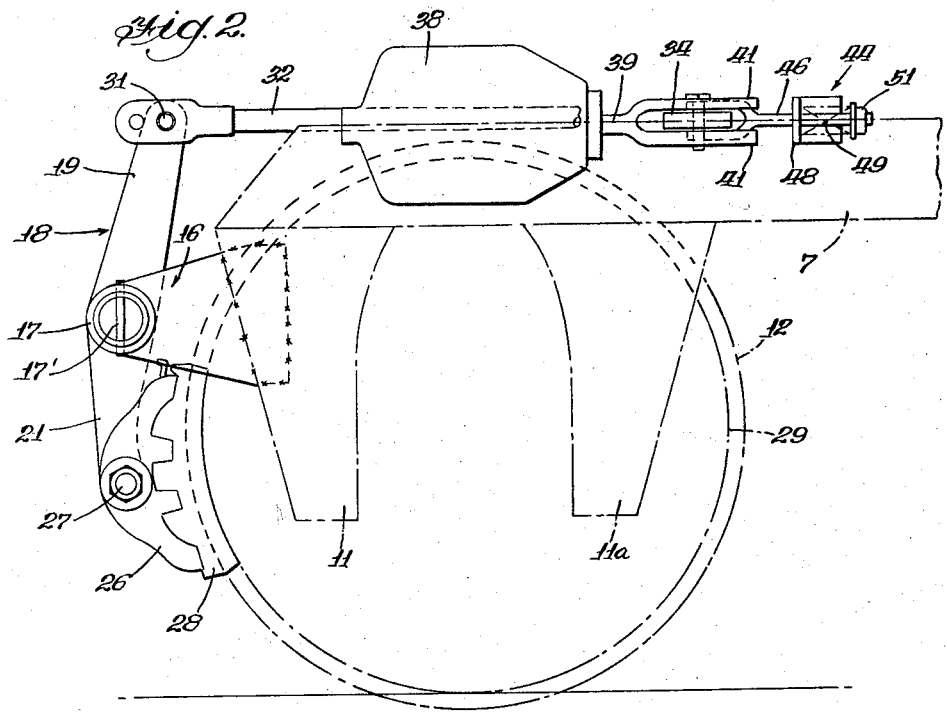
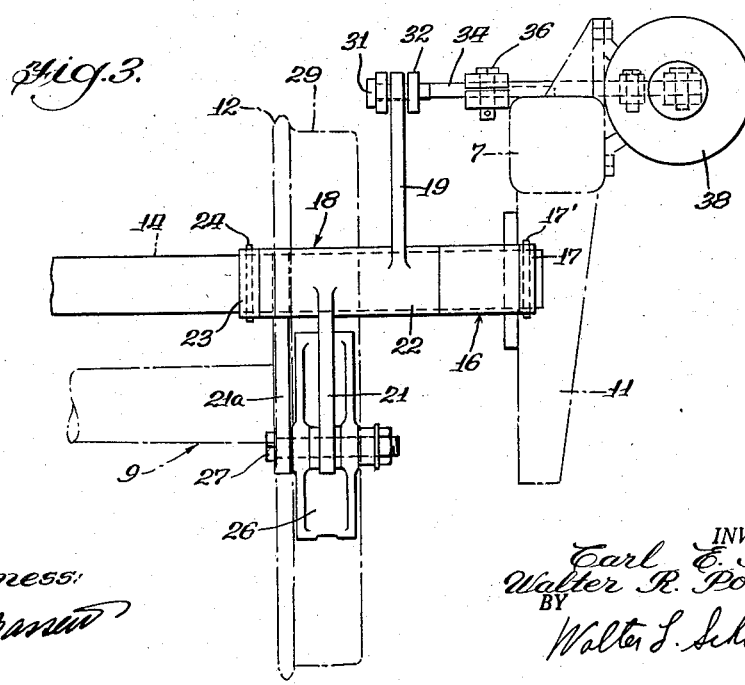
INVENTORS.
Carl E. Tack
Walter R. Polanin
BY
Walter S. Schlegel, Jr.
Atty.
Witness:
Chas. H. Barnett

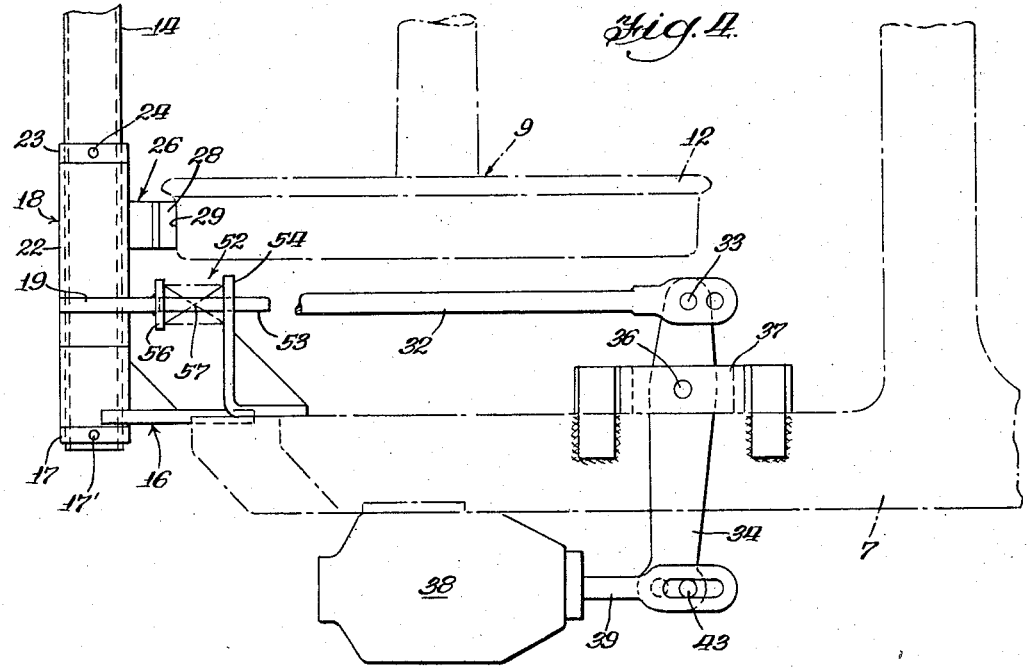

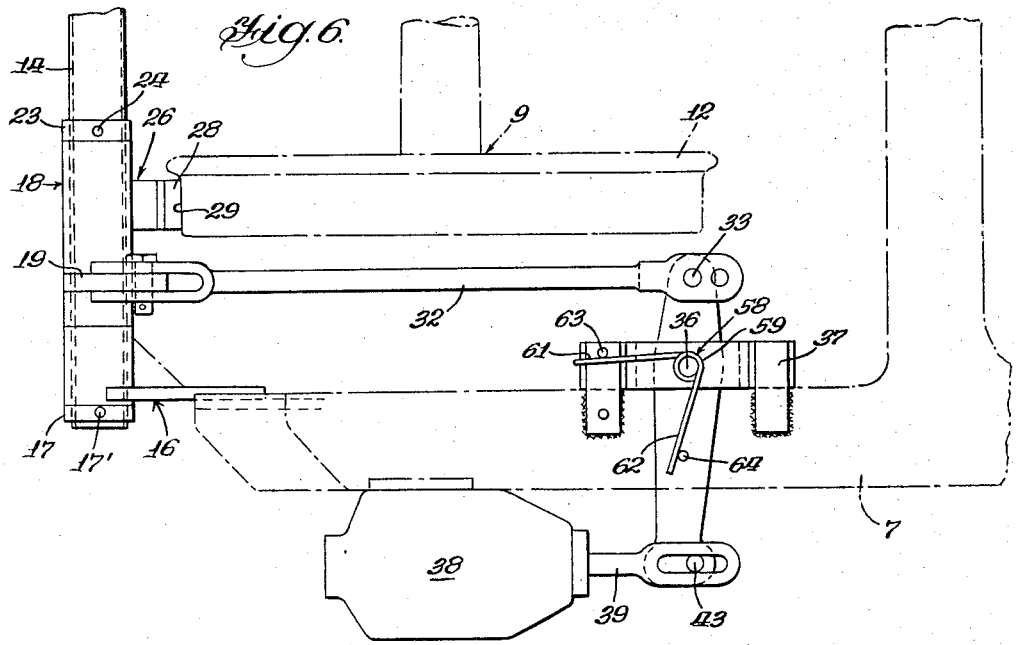
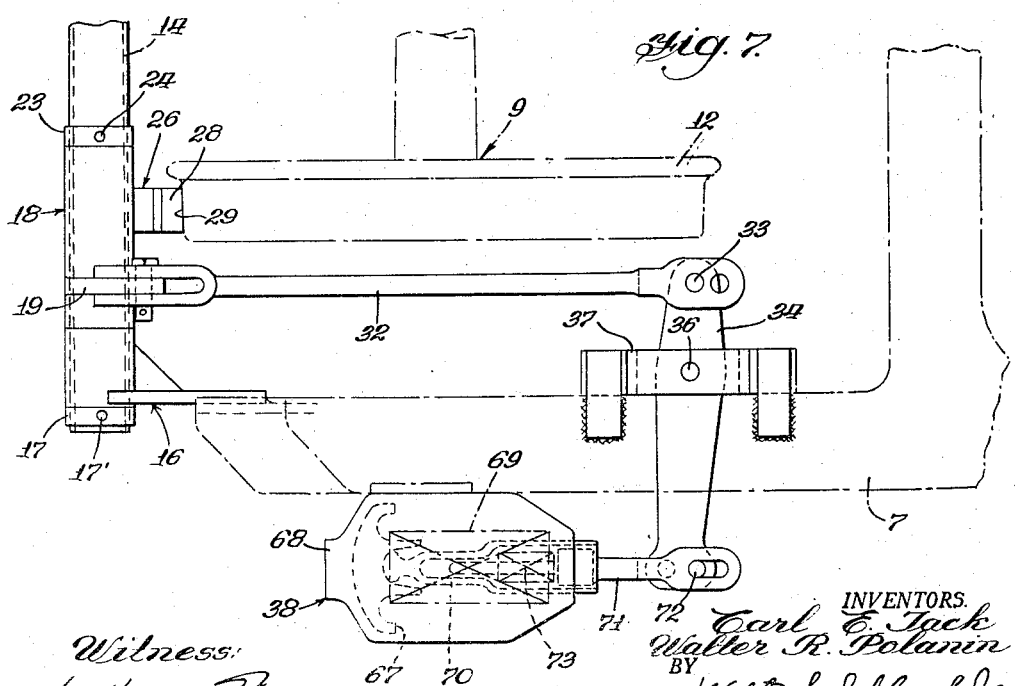

2,877,870

CONSTANT CONTACT RAILWAY BRAKE ARRANGEMENT

Carl E. Tack and Walter R. Polanin, Chicago, Ill., assignors to American Steel Foundries, Chicago, Ill., a corporation of New Jersey Application November 14, 1955, Serial No. 546,309

20 Claims. (Cl. 188—33)

This invention relates to railway brakes and more particularly to a tread brake arrangement embodying means for maintaining the tread surfaces of metallic railway car wheels in suitable condition to insure the shunting of railway track signals.

In the use of conventional tread brakes, the brake shoe is normally maintained out of contact with the tread surface of its associated wheel and is only moved into braking engagement with the wheel during deceleration of the wheel. During the interval of time between braking applications, a wheel tread surface may become coated with foreign material which interferes with or prevents the shunting of railway track signals. To insure the proper shunting of track signals, it is an object of the present invention to provide a brake arrangement embodying means effective to maintain the tread surfaces of wheels in a clean uncoated condition.

Another object of the invention resides in the provision of a railway tread brake arrangement embodying auxiliary power means adapted to maintain a brake shoe in constant contact engagement with a wheel tread surface to condition same to thereby insure the proper shunting of railway track signals.

A further object of the invention resides in the provision of resilient means adapted to yieldably resist movement of a brake shoe out of contact engagement with a wheel tread surface.

Another object of the invention resides in the provision of a brake arrangement embodying means to vary the force exerted by said resilient means in applying the brake shoe to the wheel tread surface.

Another object of the invention resides in the provision of a brake arrangement which is relatively simple and inexpensive in construction and reliable in operation.

The invention embodies other novel features, details of construction and arrangement of parts which are hereinafter set forth in the specification and claims and illustrated in the accompanying drawings, wherein:

Figure 1 is a fragmentary top plan view illustrating a brake arrangement embodying features of the invention;

Figure 2 is a side elevational view of same;

Figure 3 is an end elevation view of same;

Figure 4 is a fragmentary top plan view illustrating a modified form of the invention;

Figure 5 is a side elevational view of same;

Figure 6 is a fragmentary top plan view illustrating another modified form of the invention; and Figure 7 is a fragmentary top plan view illustrating another modified form of the invention.

Referring now to the drawings for a better understanding of the invention, a railway truck is shown as comprising a frame 6 having side rails 7—7 interconnected by transoms 8—8, the frame being resiliently supported upon wheel and axle assemblies 9—9 mounted at their ends in journal boxes (not shown) engaged between spaced pedestals 11—11a depending from the side rails.

Each wheel 12 of each assembly 9 is adapted to be provided with a brake arrangement, only one of which is shown and hereinafter described as they are identical in construction and operation. The brake arrangement is shown as comprising a tubular shaft 14 disposed adjacent the end of the truck frame 6 and mounted at its ends in bearing brackets 16—16 welded or otherwise secured to the inner sides of the pedestals 11—11 adjacent the ends of the side rails 7—7. Collars 17—17 are secured by pins 17' to opposite ends of the shaft 14 to prevent axial movement of the shaft relative to the brackets.

A hanger lever 18 is pivotally mounted intermediate its ends upon the shaft 14 adjacent the inboard side of the bearing bracket 16 and is shown as comprising an upper arm 19 and lower arms 21—21a disposed on opposite sides of a tubular bearing portion 22, the lever being engaged against axial movement relative to the bearing bracket by means of an abutment collar 23 secured to the shaft by a pin 24.

A brake head 26 is pivotally mounted on the lower ends of the lower arms 21—21a by means of a pin 27, and a metallic brake shoe 28 is detachably mounted on the brake head for constant contact engagement with the tread surface 29 of the metallic wheel 12.

The upper end of the upper arm 19 is pivotally connected at 31 to one end of a connecting rod 32 which has its other end pivotally connected at 33 to the inboard end of a dead cylinder lever 34. The cylinder lever 34 extends transversely of the truck above the side rail 7 and is pivotally connected by a pin 36 to a bracket 37 which is welded or otherwise secured to the side rail.

A power cylinder 38 is mounted on the outboard side of the side rail 7 and has a piston rod 39 operable responsive to the flow of pressure fluid into the cylinder to engage and actuate the cylinder lever 34. The outer end of the piston rod 39 is bifurcated to provide spaced parallel arms 41—41 to straddle the outboard end of the cylinder lever, the arms being formed with vertically aligned slots 42—42 to slidably receive opposite ends of a pin 43, or the like, mounted on the outboard end of the cylinder lever to thus provide a lost-motion connection between the piston and cylinder lever.

The brake arrangement illustrated in Figures 1–3 in the drawings is provided with auxiliary power means indicated generally at 44, operative to maintain constant contact engagement between the brake shoe 28 and the wheel tread surface 29 when the piston rod 39 is in its retracted inoperative position. The auxiliary power means 44 is shown in this form of the invention as comprising an actuating rod 46 having a bifurcated end straddling and pivotally connected to the outboard end of the cylinder lever 34 by means of a pin 47. The actuating rod 46 is slidably engaged within an aperture formed in a guide bracket 48 welded or otherwise secured to the side rail 7. A helical compression spring 49 is mounted on the actuating rod 46 for engagement between the bracket 48 and an adjustment nut 51 threaded onto the outer end of the rod, the spring acting through the actuating rod, cylinder lever, connecting rod 32 and hanging lever 18 to maintain the brake shoe 28 in constant contact engagement with the wheel tread surface 29.

The force exerted by the spring 49 may readily be varied by merely adjusting the position of the nut 51 axially of the actuating rod 46. It will be understood that the auxiliary power means 44 serves to maintain the brake shoe 28 in constant contact engagement with the wheel tread surface 29 for the purpose of cleaning the tread surface wherein all foreign particles which tend to adhere to the tread surface may be removed. If these foreign particles were allowed to remain on the tread surface, the particles would form a protective coating on the tread surface. This coating acts as an insulator which may prevent flow of an electrical current from one wheel through the axle to the other wheel at any location on the tracks wherever an electrical shunting device may be utilized. The power cylinder 38 is connected to a suitable source of fluid under pressure and adapted to coact with the auxiliary power means 44 in applying the brake shoe to the tread surface with sufficient force to decelerate the wheel and axle assembly 9.

Figures 4 and 5 in the drawings illustrate a modified form of the invention in which the brake shoe 28 is maintained in constant contact engagement with the wheel tread surface 29 by means of an auxiliary power means indicated generally at 52. The power means 52 is shown as comprising an actuating rod 53 slidably mounted in an aperture formed in a guide bracket 54 welded or otherwise secured to the inner side of the side rail 7. The actuating rod is provided with a head 56 for abutting engagement against the upper arm 19 of the hanger lever 18, and a helical compression spring 57 is mounted on the rod between said head and guide bracket. The spring 57 is adapted to act through the rod and hanger lever to maintain the brake shoe 28 in constant contact engagement with the wheel tread surface 29. This form of the invention is otherwise similar to the form heretofore shown and described and corresponding numbers have therefore been applied to corresponding parts.

Figure 6 illustrates another modified form of the invention in which an auxiliary power means 58 is incorporated in the brake arrangement to maintain the brake shoe 28 in constant contact engagement with the wheel tread surface 29. In this form of the invention the auxiliary power means is shown as comprising a helical torque spring 59 mounted on the pivot pin 36 employed to connect the dead cylinder lever 34 to the bracket 37. The ends 61 and 62 of the spring engage pins 63 and 64, respectively, mounted on the bracket 37 and lever 34, respectively, to urge the lever in a counter-clockwise direction with a force sufficient to maintain the brake shoe in constant contact engagement with the wheel tread surface 29. This form of the invention is otherwise similar to the forms heretofore described.

Figure 7 illustrates another form of the invention in which an auxiliary power means is provided within the power cylinder 38 to maintain the brake shoe 28 in constant contact engagement with the wheel tread surface 29. The auxiliary power means is shown as comprising a piston 67 mounted within the cylinder 38 and normally urged into abutting engagement against suitable back stops (not shown) provided within the cylinder on the back wall 68 thereof by means of a compression spring 69.

A primary piston rod 70 is provided for engagement by the piston and is bored to slidably receive the inner end of an inner piston rod 71 which is pivotally connected at 72 to the cylinder lever 34. A compression spring 73 is interposed between opposed shoulders or seats provided on the piston rods 70 and 71 to yieldably resist inward movement of the rod 71 relative to the primary rod 70. The spring 73 normally acts through the rod 71 to pivot the lever 34 in a counterclockwise direction and thereby maintain the brake shoe in constant contact engagement with the wheel tread surface 29.

In each of the several forms of the invention herein shown and described, it will be noted that the resilient auxiliary power means serves to maintain the brake shoe in constant contact engagement with the wheel tread surface to condition same for the shunting of railway track signals. It will also be noted that the auxiliary power means could be applied to conventional wheel brake rigging without involving major changes in the rigging and without interfering with the normal braking operation of the rigging.

We claim:

1. In a brake arrangement for a railway car truck, a truck frame supported on a metallic wheel having a tread surface, a tread brake rigging provided on said frame and including a brake shoe to frictionally engage said tread surface and an actuating lever supported by the frame and connected to said shoe, primary power means operatively connected to said actuating lever to actuate said rigging to apply the brake shoe to said surface to decelerate said wheel, auxiliary power means acting upon said rigging to maintain said brake shoe in constant engagement with said tread surface to condition the latter to insure shunting of track signals, said primary and auxiliary power means acting simultaneously on said brake rigging during deceleration of said wheel, said auxiliary power means acting on said brake rigging at all times.

2. In a brake arrangement for a railway car truck, a truck frame supported on a metallic wheel having a tread surface, a tread brake rigging provided on said frame and including a brake shoe to frictionally engage said tread surface and an actuating lever supported by the frame and connected to said shoe, primary power means operatively connected to said actuating lever to actuate said rigging to apply sufficient force through the brake shoe to said tread surface to decelerate said wheel, auxiliary power means to actuate said rigging to maintain said brake shoe in continuous and constant contact engagement with said tread surface at all times to condition the latter to insure shunting of track signals, said auxiliary power means including a resilient member operable to yieldably resist movement of said brake shoe away from said tread surface.

3. In a tread brake arrangement for a railway car truck, a brake rigging including a brake shoe, an actuating lever supported by the truck and connected to said shoe, primary power means connected to said actuating lever and operable to actuate said rigging to apply a braking force to said brake shoe, and an auxiliary power means operable to actuate said rigging to maintain said brake shoe in constant contact engagement with a wheel tread surface to condition the latter to insure shunting of track signals, said primary and auxiliary power means acting simultaneously on said brake shoe during application of said braking force, said auxiliary power means maintaining said brake rigging and said brake shoe substantially stationary at all times.

4. In a tread brake arrangement for a railway car truck, a brake rigging including a brake shoe, an actuating lever supported by the truck and connected to said shoe, primary power means operatively connected to said actuating lever and operable to actuate said rigging to apply a braking force to said brake shoe, and an auxiliary power means including a resilient member operable to actuate said rigging to maintain said brake shoe in constant contact engagement with a wheel tread surface to condition the latter to insure shunting of track signals, said primary and auxiliary power means acting simultaneously on said brake shoe during application of said braking force, said auxiliary power means maintaining said brake rigging and said brake shoe substantially stationary at all times.

5. In a tread brake arrangement for a railway car truck, a brake rigging including a brake shoe, an actuating lever supported by the truck and connected to said shoe, primary power means operatively connected to said actuating lever and operable to actuate said rigging to apply a braking force to said brake shoe, and an auxiliary power means including a resilient member operable to actuate said rigging to maintain said brake shoe in constant contact engagement with a wheel tread surface to condition the latter to insure shunting of track signals, said auxiliary power means acting on said rigging at all times, and a lost motion connection interconnecting said primary power means and said brake rigging.

6. In a brake arrangement for a railway vehicle comprising a frame supported on a wheel and axle assembly, the combination of: an actuating lever supported by the frame; friction means operatively connected to said lever; resilient means supported by the frame and operatively connected to said actuating lever, said resilient means being operable to maintain said friction means in continuous contact with a wheel of said assembly; means operatively connected to said actuating lever to apply a decelerating force to said friction means to decelerate said wheel, said decelerating means and said resilient means coacting on said shoe during the deceleration of said wheel.

7. In a brake arrangement for a railway car truck, a truck frame supported on a metallic wheel having a tread surface, a tread brake rigging comprising a shoe engageable with said tread surface, an actuating lever for actuation of said brake rigging, a primary power source operatively connected to said actuating lever to apply a decelerating force through said shoe to said tread surface, an auxiliary power source operatively connected to said actuating lever to maintain said shoe in constant engagement against the tread surface to condition the latter to insure shunting of track signals, said primary power source and said auxiliary power source coacting on said actuating lever and said shoe when said decelerating force is applied to the tread surface, said auxiliary power source acting on said actuating lever and said shoe at all other times.

8. A brake arrangement according to claim 7, wherein said operable connection comprises a lost motion connection, said lost motion connection being disposed at the outboard end of said actuating lever, said lost motion connection allowing said auxiliary power source to actuate said actuating lever at all times prior to application of said decelerating force in order to maintain said shoe in constant engagement with said tread surface.

9. A brake arrangement according to claim 7, wherein the movement of said actuating lever and said shoe are substantially limited so as to preclude further movement of said brake arrangement subsequent to application of said decelerating force.

10. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, said operable connection comprising a lost motion connection, and an auxiliary power means associated with the brake rigging and operably connected to said dead actuating lever to maintain said brake shoe in constant contact engagement with said tread surface to condition same to insure shunting of railway track signals, said primary and auxiliary power means coacting on said actuating lever upon application of a decelerating force to said wheel.

11. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, said primary power means being operatively connected to said brake shoe to apply a decelerating force to said wheel, and an auxiliary power means associated with the brake rigging operable to maintain said brake shoe in constant contact engagement with said tread surface to condition same by a conditioning force to insure shunting of railway track signals, said auxiliary power means comprising a resilient member operable to yieldably resist movement of said brake shoe out of contact engagement with said tread surface, said decelerating force and said conditioning force acting simultaneously on said wheel through said shoe when decelerating said wheel.

12. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, and an auxiliary power means associated with the brake rigging operable to maintain said brake shoe in constant contact engagement with said tread surface to condition same to insure shunting of railway track signals, said auxiliary power means comprising a resilient member operable to yieldably resist movement of said brake shoe out of contact engagement with said tread surface, said resilient member acting between said frame and the upper end of said hanger lever.

13. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, and an auxiliary power means associated with the brake rigging operable to maintain said brake shoe in constant contact engagement with said tread surface to condition same to insure shunting of railway track signals, said auxiliary power means comprising a resilient member operable to yieldably resist movement of said brake shoe out of contact engagement with said tread surface, said resilient member acting between said frame and said actuating lever.

14. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, and an auxiliary power means associated with the brake rigging operable to maintain said brake shoe in constant contact engagement with said tread surface to condition same to insure shunting of railway track signals, said auxiliary power means comprising a resilient member operable to yieldably resist movement of said brake shoe out of contact engagement with said tread surface, said resilient member comprising a compression spring acting between said frame and said actuating lever.

15. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, and an auxiliary power means associated with the brake rigging operable to maintain said brake shoe in constant contact engagement with said tread surface to condition same to insure shunting of railway track signals, said auxiliary power means comprising a resilient member operable to yieldably resist movement of said brake shoe out of contact engagement with said tread surface, said resilient member comprising a torque spring acting between said frame and said actuating lever.

16. In a railway car truck, a truck frame supported on a metallic wheel having a tread surface, a brake rigging comprising a vertical hanger lever pivotally supported intermediate its ends on said frame, a brake shoe supported for pivotal movement on the lower end of said lever, a push rod having one end thereof pivotally connected to the upper end of said lever, a dead actuating lever extending transversely of the frame, said lever being pivotally connected intermediate its ends to said frame and having its inboard end pivotally connected to the other end of said push rod, a primary power means provided on said frame operatively connected to the outboard end of said actuating lever, and an auxiliary power means associated with the brake rigging operable to maintain said brake shoe in constant contact engagement with said tread surface to condition same to insure shunting of railway track signals, said primary power means comprising telescopically engaged pistons, and said auxiliary power means comprising a resilient member compressedly engaged between said pistons.

17. In a brake arrangement for a railway car truck, a truck frame supported on a metallic wheel having a tread surface, a tread brake rigging comprising a shoe engageable with said tread surface, an actuating lever for actuation of said brake rigging, a primary power source operatively connected to said actuating lever to apply a decelerating force through said shoe to said tread surface, an auxiliary power source operatively connected to said actuating lever to maintain said shoe in constant engagement against the tread surface to condition the latter to insure shunting of track signals, said primary power source and said auxiliary power source coacting on said actuating lever and said shoe when said decelerating force is applied to the tread surface, said auxiliary power source acting on said actuating lever and said shoe at all other times, said auxiliary power source comprising a resilient member, said resilient member comprising a torque spring acting between said frame and said actuating lever.

18. In a brake arrangement for a railway car truck, a truck frame supported on a metallic wheel having a tread surface, a tread brake rigging comprising a shoe engageable with said tread surface, an actuating lever for actuation of said brake rigging, a primary power source operatively connected to said actuating lever to apply a decelerating force through said shoe to said tread surface, an auxiliary power source operatively connected to said actuating lever to maintain said shoe in constant engagement against the tread surface to condition the latter to insure shunting of track signals, said primary power source and said auxiliary power source coacting on said actuating lever and said shoe when said decelerating force is applied to the tread surface, said auxiliary power source acting on said actuating lever and said shoe at all other times, said primary power source comprising telescopically engaged pistons, said auxiliary power source comprising a resilient member compressedly engaged between said pistons.

19. In a brake arrangement for a railway car truck, a truck frame supported on a metallic wheel having a tread surface, a tread brake rigging comprising a brake lever, a shoe carried by said lever and engageable with said tread surface, an actuating lever for actuation of said brake rigging, a primary power source operatively connected to said actuating lever to apply a decelerating force through said shoe to said tread surface, an auxiliary power source operatively connected to said actuating lever to maintain said shoe in constant engagement against the tread surface to condition the latter to insure shunting of track signals, said primary power source and said auxiliary power source coacting on said actuating lever and said shoe when said decelerating force is applied to the tread surface, said auxiliary power source acting on said actuating lever and said shoe at all other times, said auxiliary power source comprising a resilient member mounted on said frame and acting between said frame and the brake lever.

20. In a brake arrangement for a railway vehicle, a wheel and axle assembly, a frame mounted thereon, an actuating lever carried by the frame, a brake shoe operatively connected to said lever, a compression spring mounted on said frame and acting between said frame and actuating lever to maintain said shoe in continuous contact with a wheel of said assembly, means operably connected to said lever to apply a decelerating force to said shoe to decelerate said wheel, said means and compression spring coacting on said shoe during the deceleration of said wheel.

References Cited in the file of this patent

UNITED STATES PATENTS

| Number | Name | Date |
| --- | --- | --- |
| Re. 24,176 | Heater | July 3, 1956 |
| 2,051,967 | Saito et al. | Aug. 25, 1936 |
| 2,352,222 | Pogue et al. | June 27, 1944 |
| 2,665,778 | Mueller | Jan. 12, 1954 |
| 2,685,621 | Callender | Aug. 3, 1954 |
| 2,769,509 | Watts | Nov. 6, 1956 |